Figure 4:
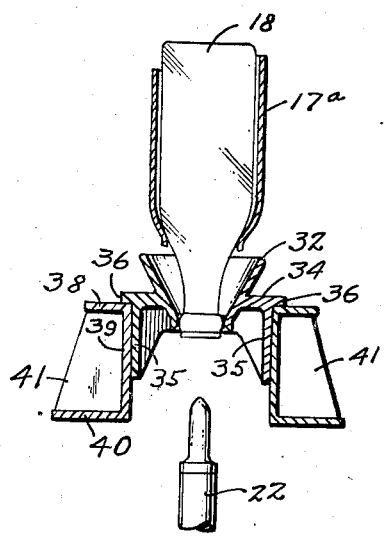

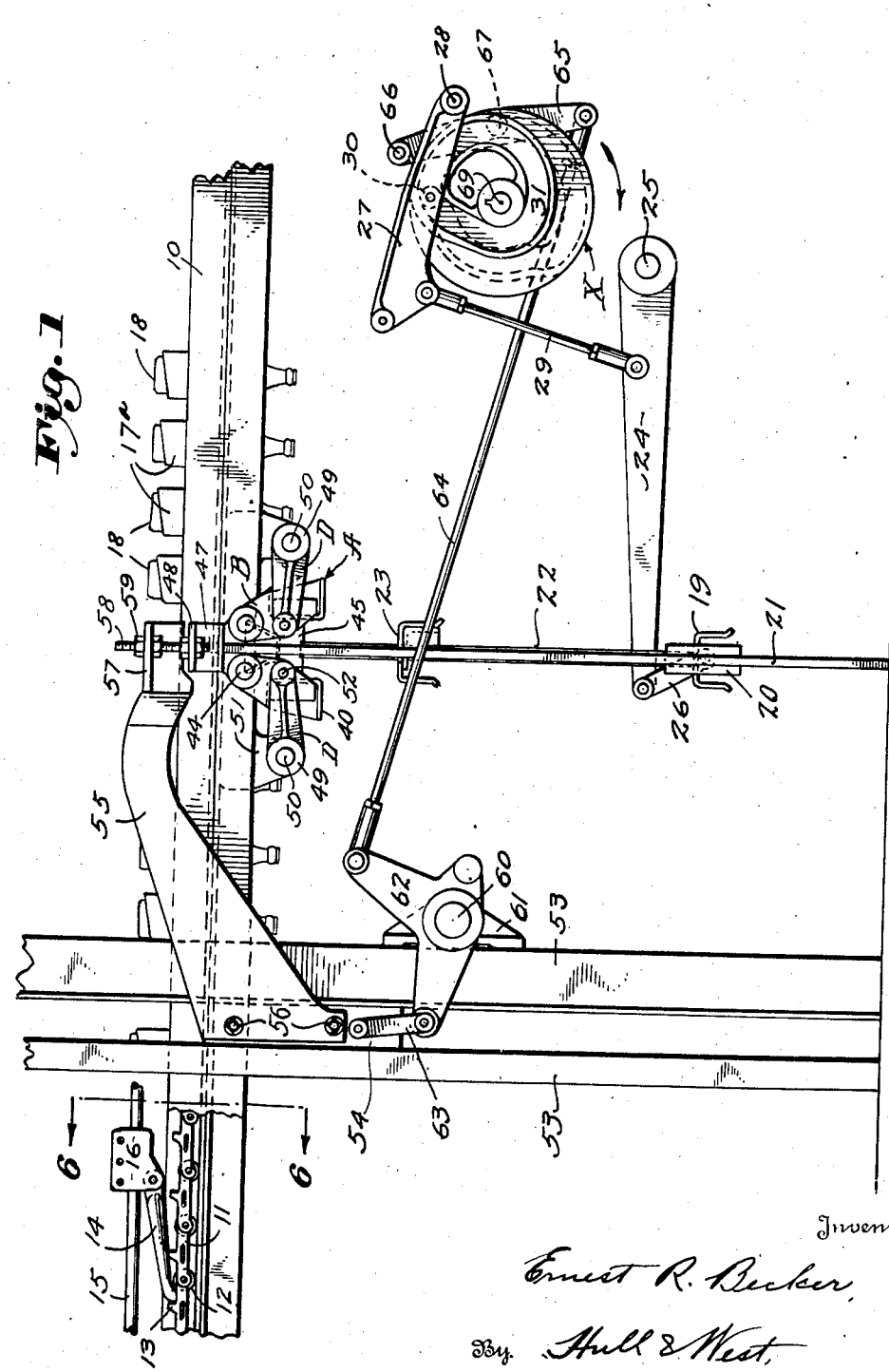

Sept. 18, 1945.   E. R. BECKER   2,385,050
BOTTLE CLEANING APPARATUS
Filed Aug. 15, 1942   4 Sheets-Sheet 2
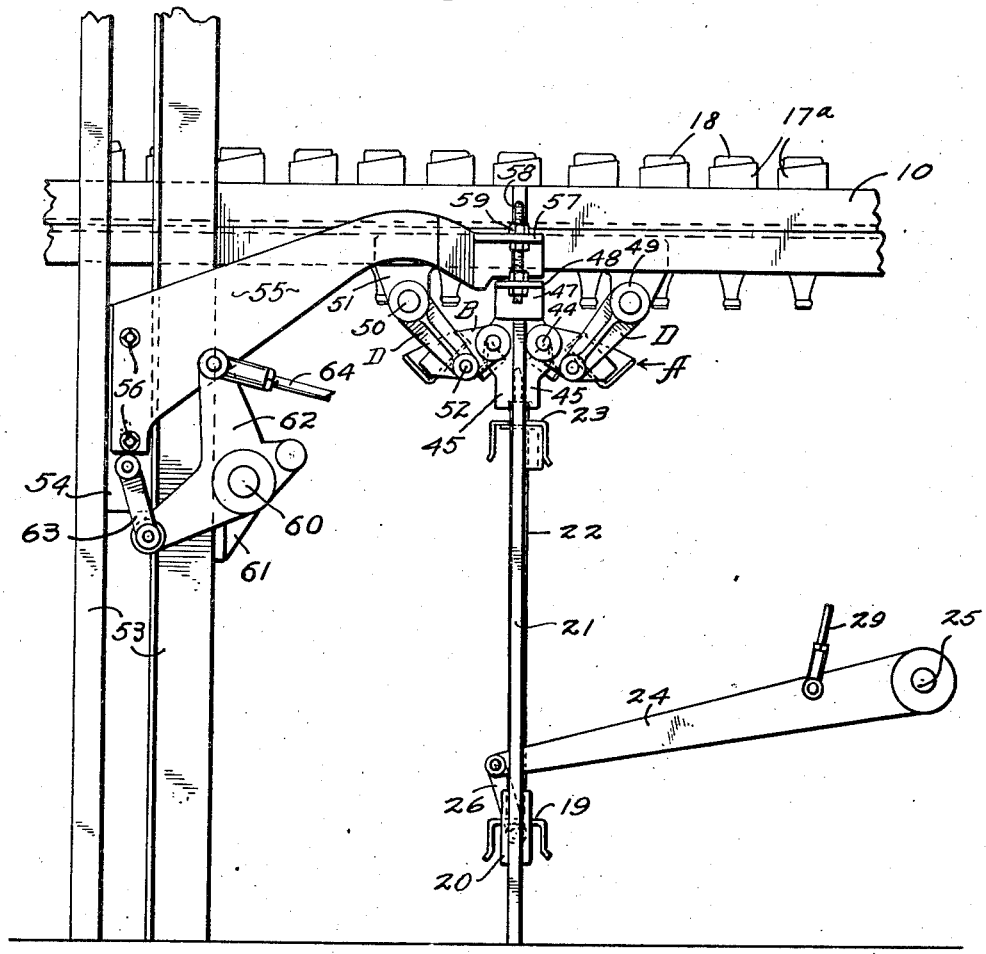
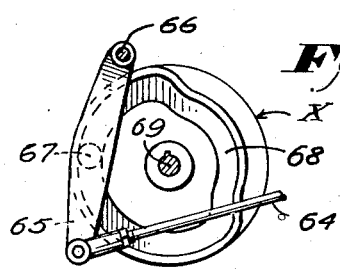

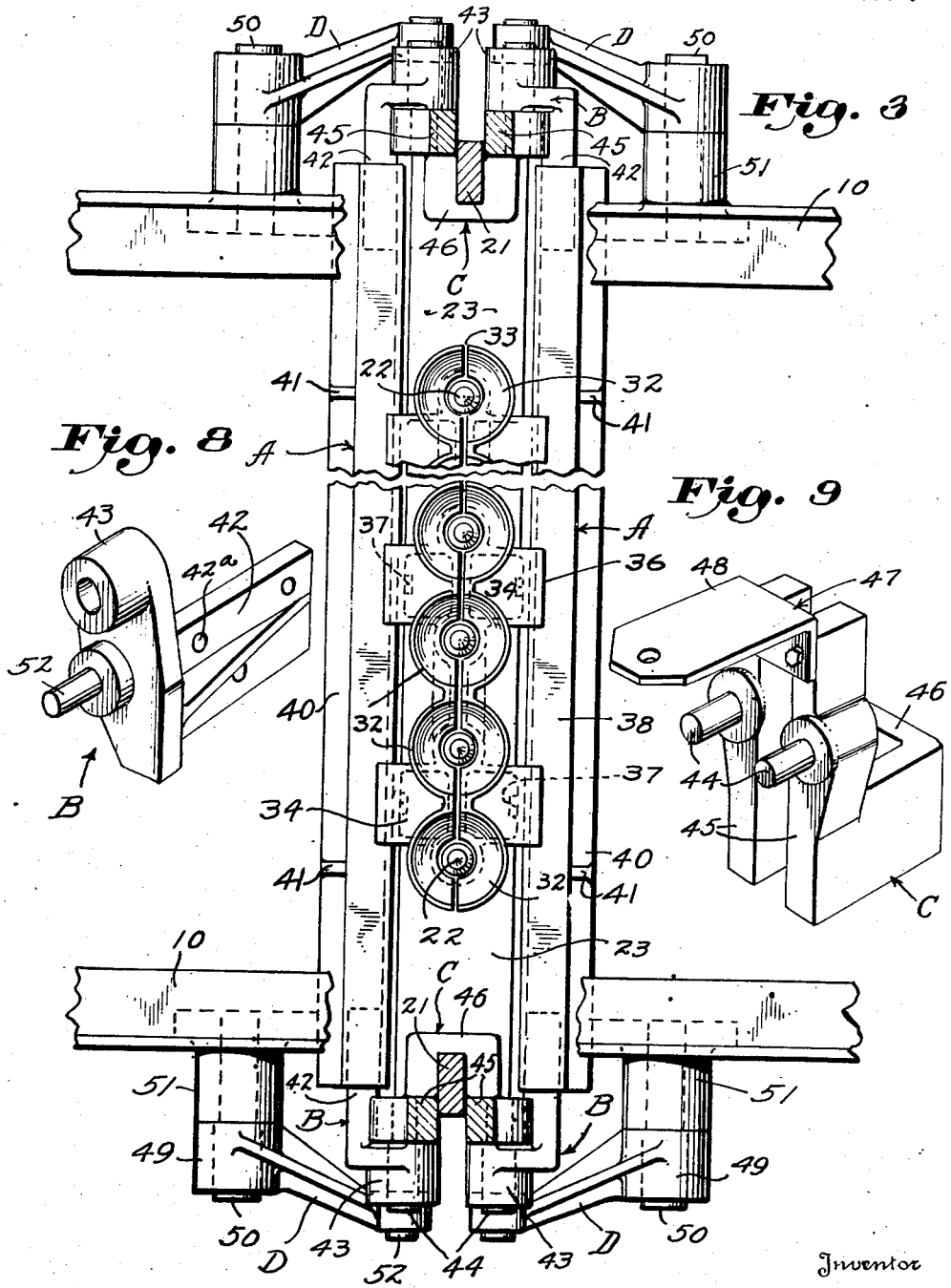

Sept. 18, 1945.  E. R. BECKER  2,385,050
BOTTLE CLEANING APPARATUS
Filed Aug. 15, 1942   4 Sheets-Sheet 4

Inventor
Ernest R. Becker,
By Hull & West,
Attorneys.

Patented Sept. 18, 1945

2,385,050

UNITED STATES PATENT OFFICE 2,385,050

BOTTLE CLEANING APPARATUS

Ernest R. Becker, Oak Park, Ill., assignor to The Liquid Carbonic Corporation, Chicago, Ill., a corporation of Delaware Application August 15, 1942, Serial No. 454,901

13 Claims. (Cl. 141—7)

This invention relates to bottle cleaning apparatus of the general type wherein the bottles are mounted on transverse carriers flexibly connected to side chains and constituting therewith an endless conveyor by which the bottles are advanced intermittently through the apparatus and are subjected, during their transit therethrough, to various interior and exterior treatments with liquid, their exteriors and interiors also being subjected to the action of brushes, as part of the cleaning treatment.

The particular invention disclosed herein relates to mechanism whereby the mouths of the bottles on each transverse carrier are accurately centered with respect to one or more transverse series of spindles which are projected into the bottles and removed therefrom during a stationary cycle of the progress of the endless conveyor. The spindles thus reciprocated and inserted into the bottles may be employed for lifting the bottles from their respective carriers into operative relation to brushes which cleanse the exterior surfaces of the bottles, as well as for the purpose of injecting cleansing or rinsing fluids into the bottles.

Transverse series of inverted conical cups, each series of such cups being mounted on a transverse supporting member and corresponding in number and transverse spacing with the bottle holders in each carrier brought thereabove and having their centers in axial alignment with the axes of the bottle holders of such carriers, have long been in use in bottle cleaning apparatus of the type referred to. In operation, the supporting members for the cups have been reciprocated in a vertical plane, their reciprocating movements being so synchronized with the movements of the bottle carriers that the bottle cups would reach their upper bottle-mouth centering positions while the bottle carriers were stationary and immediately before the lifting or rinsing spindles would be inserted into the bottles on said carriers, and the cups and the spindles would be withdrawn to their lower or clearance positions before the carriers would be again advanced.

One of the chief objections to the use of bottle-mouth centering cups in the past has been the fact that fragments of glass would very frequently lodge in the cups in such manner as to prevent their proper reception of the bottle necks as the cup supports neared the upper ends of their centering strokes. When one or more of such fragments have so lodged in a cup, the corresponding spindle, instead of entering the neck of the bottle as intended, would often deflect the bottle neck to one side, thus causing the spindle to bend, resulting in the stoppage of the entire bottle cleaning machine through the tripping of the safety device with which machines of this character have been and are provided. In some cases, where one or more fragments of glass have lodged in a cup, the corresponding spindle would push the bottle above such cup entirely out of the carrier, and this in turn has resulted in damage to the machinery during the subsequent rinsing or brushing operations. Furthermore, where bottle-centering cups of the character referred to have been used and where a complete cycle of the apparatus has been completed without the occurrence of a shutdown or damage to the equipment, it has been necessary for the operator to inspect the cups after each safety stop in order to ascertain whether glass has lodged in any of the same and, if this has occurred, to remove the glass which has so lodged. This inspection is not only a time-consuming operation but is one which subjects the operator to the risk of personal injury, and this risk is accentuated in the case of the wider machines, wherein the operator may be obliged to utilize his fingers for the purpose of removing any broken glass that may be within one or more of the cups.

It is the general purpose and object of my invention to provide bottle cleaning apparatus of the type referred to with centering cups which will not be liable to the objections noted hereinbefore and, more limitedly, to provide such apparatus with bottle-centering cups wherein broken glass or other obstructing objects may not lodge and remain thereby to interfere with the efficient operation of the apparatus and of the bottle lifting and rinsing spindles thereof.

Figure 5:
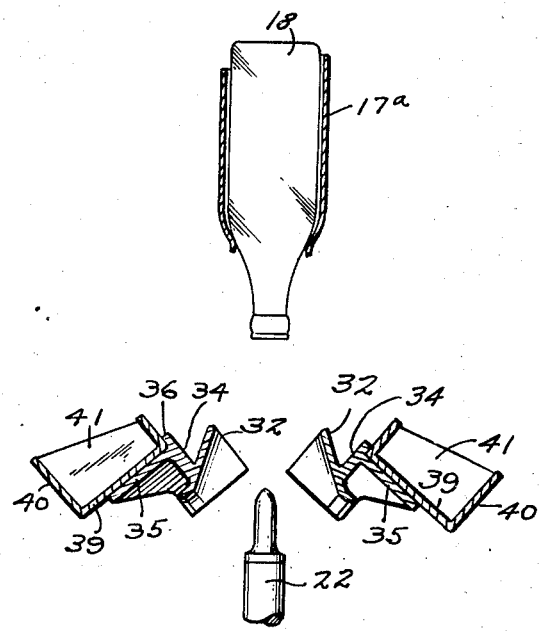
Figure 6:
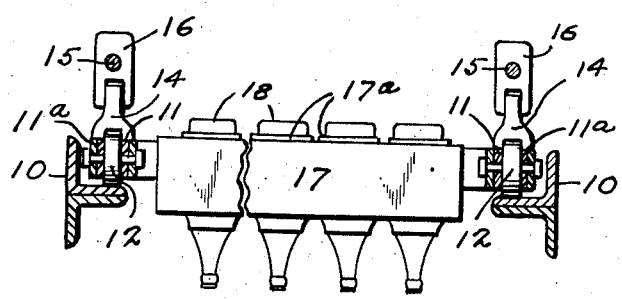

I accomplish the foregoing general objects, and more limited objects to be pointed out hereinafter, in and through the construction and arrangement of parts shown in the drawings hereof wherein Fig. 1 represents a detail in side elevation of a portion of a bottle cleaning apparatus of the character referred to wherein my invention is incorporated and showing the positions of the parts prior to inserting bottle lifting or rinsing spindles into the bottles in a transverse carrier thereabove, with the bottle cups and the support therefor in elevated or operative relation to the mouths of the bottles on the carrier thereabove; Fig. 2 a view similar to Fig. 1 showing the positions of the parts after the spindles have been withdrawn from the bottles and the cup support is in its lowered inoperative or clearance position; Fig. 3 is a sectional plan view of a transverse series of bottle centering cups mounted on their supporting members and showing the manner in which the assembly is mounted for reciprocation and the connections for operating the cup-supporting members; Fig. 4 is a detail in section showing the manner in which the mouth of a bottle is centered by one of the cups, with a spindle in proximity to the mouth of the bottle; Fig. 5 a view, similar to Fig. 4, showing the manner in which the bottle cup shown in the preceding view is opened for discharging any fragments or other objects that may have been received therewithin, the spindle being in its lowered position; Fig. 6 a detail in section through the conveyor and its supporting rails; Fig. 7 a detail in elevation of the inner cam which serves to operate the arms which raise and lower the cup supporting members; Fig. 8 a detail in perspective of one of the hinge members which serve to move the cup supporting members toward and from each other when these members are raised and lowered; and Fig. 9 a detail in perspective of one of the cross heads by means of which the cup supporting members are raised and lowered.

Bottle cleaning apparatus of the type to which my invention relates include opposed side rails 10 on which opposed links of the side conveyor chains are supported, each link comprising inner and outer members 11 and 11a, with the rollers 12 interposed therebetween, said links being supported on the side rails by the rollers. Each of the said links is shown as provided with a detent 13 (see Fig. 1) adapted to be engaged by a plurality of longitudinally spaced pairs of opposed pawls 14, the said pawls being pivotally connected by a suitable clamping bracket 16 to rods 15 reciprocably mounted on opposite sides of the apparatus. The mechanism for imparting intermittent movement to the conveyor is old and well known in the art, being shown and described, for instance, in the patent to Loew and Gruetter No. 1,313,706. Further description of the same and of the means for reciprocating the said rods and the pawls is unnecessary to an understanding of the objects of the invention sought to be protected hereby.

17 denotes a transverse bottle carrier, the opposite ends of which are connected to transversely opposed inner link members 11, preferably by means of end castings such as shown, described and claimed in my application Serial No. 399,500, filed June 24, 1941, which matured into Patent No. 2,329,687, dated Sept. 21, 1943. The transverse carriers are provided each with a series of bottle receiving seats, such as pockets 17a, adapted to support bottles 18 with their bottoms above the tops of the said pockets, the lower ends of the pockets being shaped to conform to the shoulders of the bottles, with the necks of the latter projecting therebelow.

19 denotes a cross head located below the side rails 10 and extending the full width of the apparatus and having its opposite ends reciprocably mounted by slides 20 upon upright guides 21 provided at opposite sides of the apparatus. The cross heads are provided with a plurality of spindles 22 adapted to be projected into the mouths of the bottles on the carriers that are successively brought above the said cross head, the spindles corresponding in number to the pockets 17a provided on each carrier and having their axes coincident with the axes of the said pockets, respectively, and with the axes of the bottles in said pockets, as indicated more or less diagrammatically on Fig. 3. The upper ends of the spindles project through a transverse guiding member 23 which is suitably supported in any manner, as by the upright guides 21.

24 denotes one of a pair of laterally opposed lifting arms which are secured to the shaft 25 the opposite ends of which are suitably supported in opposite side portions of the apparatus in a manner well known. The operating ends of these arms are pivotally connected to opposite end portions of the cross head 19 by means of links 26.

27 denotes an arm, one end of which is pivotally supported upon a stud 28, which in turn is also supported by a suitable portion of the side of the apparatus (not shown) and the opposite end of which is pivotally connected to a connecting rod 29, which is adjustable as to its length, the other end of said rod being pivotally connected to the adjacent lifting arm 24 intermediate of the ends of the latter. The arm 27 is provided with a roller 30, intermediate the ends thereof, which roller engages the track cam 31 on the outer face of the cam plate X.

The centering cups which I employ are of the usual inverted conical shape, but are made of segments which are so arranged and mounted upon supporting members that they present the same form of standard integral cups when the segments are in closed position, but the said segments are capable of being separated and are so separated when their supporting members are moved downwardly to provide clearance for the mouths of the bottles thereabove, thereby to permit the next forward cycle of the conveyor. The particular construction of the cups and the manner in which they are mounted upon their supporting members and the manner in which these members are operated will now be described.

The bottle centering cups, indicated at 32, are preferably cast in units of four, machined after casting, and then made in segments, by being cut in half by a suitable cutter, the cut being made longitudinally of the units, as indicated at 33 (Fig. 3). These units may then be assembled end-to-end, in accordance with the width of the apparatus, two such units being required for an "eight-wide" apparatus and five such units being required for a "twenty-wide" apparatus, with a variation in the number of units employed corresponding respectively to intermediate widths of the apparatus in which they are installed.

The halves of the end pairs of cups of each unit are provided with and united to brackets comprising each an upper member 34 having a depending flange 35, adjacent to its outer edge and located within such edge a sufficient distance to provide a flanged extension 36 of such upper member. The depending flanges 35 are secured, as by cap screws 37, to transversely extending supporting members A, preferably of channeled formation and each having an upper flange 38, the inner edge of which is overhung and engaged by a flange 36; and each supporting member has a vertical flange or web 39 to which a flange 35 is secured, as by a cap screw 37. The bottom flanges 40 of the channeled supporting members are preferably of greater width than are the upper flanges, and each supporting member is preferably provided with strengthening ribs, indicated at 41.

42 denotes an anchoring projection carried by each of pairs of hinge members, indicated generally at B, these anchoring projections being secured to the vertical flanges or webs 39 of the cup supporting members, as by means of screws (not shown) extending through holes 42ª. The said hinge members are provided with bosses 43 adapted to receive therewithin pins 44 carried by the vertical branches 45 of a cross head, indicated generally at C, the said cross head being provided with a U-shaped yoke 46 connecting the branches 45 and providing a sliding engagement for each cross head with one of the vertical guides 21. Secured to the upper ends of the branches 45 is an angle bracket 47 having a horizontal flange 48 which provides part of the means whereby the adjacent end of the cup assembly, including the cups and their supporting members, may be raised and lowered.

D denotes generally arms, each provided with a hub 49 mounted upon a pin 50 suitably supported by a bracket 51 secured to a rail 10. These arms are pivotally connected at their outer ends to pins 52, carried by the hinge members B.

For the purpose of raising and lowering the cup supporting members and the cups thereon, I provide a vertical pair of guides 53 on opposite sides of the apparatus and mount between each pair of guides a slide 54 to which one end of an arm 55 is bolted, as indicated at 56. The other end of each arm 55 is formed into an angular bracket having a horizontal flange 57 by which the outer end of each arm is adjustably connected by a bolt 58 and nuts 59 to the horizontal flange 48 of the bracket 47 which is connected to the cross head therebeneath.

60 denotes a transverse shaft rotatably supported by brackets 61 upon two of the opposed vertical members 53. 62 denotes one of a pair of bell crank levers mounted respectively on opposite ends of the said shaft and each having one arm pivotally connected to a slide 54 by means of a link 63, while a connecting rod 64, adjustable as to its length, is pivotally connected at one end to the other arm of said bell crank lever and at its opposite end to the lower end of an arm 65 which is pivotally supported on a stud 66, the latter being supported by a suitable side portion of the apparatus (not shown), said arm supporting a roller 67 intermediate its ends, which roller engages a track cam 68 on the inner face of the cam plate x (see Fig. 7) said cam plate being secured to a shaft 69 mounted for rotation in a suitable portion of the side of the apparatus (not shown).

With the parts constructed and arranged as described, the operation will be as follows: the conveyor, consisting of the side chains and the transverse bottle carriers connected thereto, is advanced intermittently along the rails 10 by the reciprocations of the rods 15, which are operated in a manner usual in the type of apparatus to which this invention relates—see, for instance, the aforesaid Loew and Gruetter patent. The conveyor having been advanced so as to bring a transverse bottle carrier above the cross head 19, the cam plate operates, through the cam 31, arm 27 and roller 30, to lift the cross head 19 and the spindles 22 thereon thereby to insert the upper ends of the spindles into the mouths of the bottles on said carrier. At the same time the cam plate also operates, through cam 68, roller 67, and arm 65, and connecting rod 64 and bell cranks 62, to lift the arms 55, and thereby to raise the centering cups so that they will be brought into engagement with the mouths of the bottles in advance of the actual projection or insertion of the spindles into the mouths of the bottles, as indicated in Figs. 1 and 4. At the end of each external brushing and/or internal rinsing operation, the cross head 19 and the spindles thereon are lowered by the operation of the cam 31 and the arms 55 are also lowered by the operation of the cam 68. This lowering movement causes the arms D to swing the lower ends of the hinge members B outwardly about the pins 44 as pivots, thereby to separate the cup-supporting members and open the cups, as indicated clearly in Figs. 2 and 5, it being noted that, when the supporting members are in their uppermost position, the arms D are substantially horizontal, whereby the said members will be moved apart as soon as lowered below the positions which they occupy in Figs. 1 and 4 whereby it will be unnecessary to make a wide slot 33 between the cup segments carried by the said members. It will be obvious that, should there be glass fragments or other foreign material in the cups, these foreign elements will be automatically dropped from their cups when the latter are in their opened condition. It will be understood, of course, that the reciprocation of the spindles and cup holders occurs during an inactive cycle of the conveyor.

From the foregoing, it will be evident that, through the construction shown and described herein, I have eliminated the objections which have attended the equipment of bottle cleaning apparatus with centering cups; also that I have accomplished this elimination by means of a construction which is comparatively simple, which is economical of production, and which has proved to be reliable in operation.

Having thus described my invention, what I claim is:

1. An apparatus for cleaning bottles comprising: a conveyor having transversely extending bottle carriers each provided with seats for supporting bottles in an inverted position on said carrier and means for imparting intermittent movement to said conveyor; a support extending transversely of the said apparatus, the said support comprising relatively movable members; a series of cup segments carried by one of the said members and a series of cooperating cup segments carried by the other of said members; vertically reciprocable means for lifting the said members, with the cup segments supported respectively thereby in assembled relation to one another toward a carrier thereabove during an inactive cycle of the conveyor, whereby the lower portions of the cups formed by said segments will engage and center the mouths of bottles on said carrier, and for thereafter lowering the said supporting members during such inactive cycle of the conveyor; and means additional to the vertically reciprocable lifting means for causing one of the said members to be moved away from the other member during the lowering movement of the said means, thereby to separate the cup segments supported respectively by said members and enable any material that may have been received within one or more of the cups comprising such segments to be discharged.

2. An apparatus for cleaning bottles comprising: a conveyor having transversely extending bottle carriers each provided with seats for supporting bottles in an inverted position on said carrier and means for imparting intermittent movement to said conveyor; a pair of supporting members extending transversely of the said apparatus in parallel relation to each other; a series of cup segments carried by each of the said members and adapted and so arranged that, when the supporting portions of the said members are in proximity to each other, cups comprising the said segments will be formed; cross heads located respectively at opposite ends of the said members; hinge members each having one end connected to a supporting member and its other end pivotally connected to the adjacent cross head; means for raising the said cross heads, and thereby the supporting members and the cup segments carried thereby, toward a carrier during an inactive cycle of the conveyor, with the supporting portions of said members in proximity to each other, thereby to bring the cups formed by the segments into engagement with the mouths of the bottles, and for thereafter lowering the said cross heads and their supporting members and the cup segments during such inactive cycle of the conveyor; and arms each pivotally connected at one end to a hinge member and at its opposite end to a relatively non-movable part of the apparatus, the pivotal connections being so arranged that the arms will operate the hinge members thereby to separate the portions of the supporting members having the cup segments secured thereto as the said supporting members are moved downwardly.

3. An apparatus for cleaning bottles comprising: a conveyor having transversely extending bottle carriers each provided with seats for supporting bottles in an inverted position on said carrier and means for imparting intermittent movement to said conveyor; a pair of supporting members extending transversely of the said apparatus in parallel relation to each other; a series of cup segments carried by one of the said supporting members and a series of cooperating cup segments carried by the other of said supporting members, the segments on the said members being so arranged that, when the said members are in proximity to each other the segments on one member will form cups with the segments on the other member; a vertically reciprocable cross head at each end of the pair of supporting members; connections between each of said cross heads and the ends of the supporting members adjacent thereto; means for raising the said cross heads thereby to bring the said supporting members into proximity to the mouths of the bottles on a carrier thereabove during an inactive cycle of the conveyor and for lowering the said cross heads during such inactive cycle; and means operated by the reciprocations of the said cross heads for moving the said supporting members toward each other during the upward movement of said cross heads, thereby to form cups from the segments carried by the said members, the last mentioned means also serving to separate the said supporting members, with consequent separation of the segments carried respectively thereby, during the downward movement of the said cross heads.

4. An apparatus for cleaning bottles comprising: a conveyor having transversely extending bottle carriers each provided with seats for supporting bottles in an inverted position on said carrier and means for imparting intermittent movement to said conveyor; a pair of supporting members extending transversely of the said apparatus in parallel relation to each other; cup segments supported by each of the said members and adapted and so arranged that, when the supporting portions of the said members are in proximity to each other, cups comprising the said segments will be formed; a vertically reciprocable cross head at each end of the pair of supporting members, a vertical guide on each side of said apparatus, a pair of arms on opposite sides of the apparatus each having one end slidably connected to the corresponding vertical guide and its opposite end adjustably connected to the cross head adjacent thereto, means pivotally connecting each cross head with the ends of the supporting members adjacent thereto; means for raising and lowering the said arms and means additional to the said cross heads and the connections between the same and the supporting members for moving toward each other the portions of the supporting members to which the cup segments are secured during the raising movement of the said supporting members and for moving the said portions of the supporting members away from each other during the lowering movement of the supporting members.

5. An apparatus for cleaning bottles comprising: a conveyor having transversely extending bottle carriers each provided with seats for supporting bottles in an inverted position thereon and means for imparting intermittent movement to said conveyor; a support extending transversely of the said apparatus below the said conveyor and below the bottle carriers brought successively thereabove by the movement of said conveyor; bottle-centering cups mounted on said support and adapted to engage the mouths of bottles with their lower portions; vertically reciprocable means connected with the said support for moving the same toward and from a carrier thereabove during an inactive cycle of the conveyor thereby to bring the lower portions of the cups into and out of engagement with the mouths of the bottles on the carrier thereabove; and means operative by the downward movement of the support away from the said carrier thereby to dislodge from any one or more of the cups any material that may have been received therewithin.

6. An apparatus for cleaning bottles comprising: a conveyor having transversely extending bottle carriers each provided with seats for supporting bottles in an inverted position thereon and means for imparting intermittent movement to said conveyor; a support extending transversely of the said apparatus below the said conveyor and below the bottle carriers brought successively thereabove by the movement of said conveyor; bottle-centering cups mounted on said support and adapted to engage the mouths of bottles with their lower portions; vertical guides on opposite sides of the said apparatus; means reciprocably supported by said guides and connected with the said support for moving the latter toward and from a carrier thereabove during an inactive cycle of the said conveyor, thereby to bring the lower portions of the cups thereon into and out of engagement with the mouths of the bottles on said carrier; and means operative by the movement of the support away from the said carrier, thereby to dislodge from any one or more of the cups any material that may have been received therewithin.

7. An apparatus for cleaning bottles comprising: a conveyor having transversely extending bottle carriers each provided with seats for supporting bottles in an inverted position thereon and means for imparting intermittent movement to said conveyor; a support extending transversely of the said apparatus below the said conveyor and below the bottle carriers brought successively thereabove by the movement of said conveyor; bottle-centering cups mounted on said support and adapted to engage the mouths of bottles with their lower portions; vertical guides on opposite sides of the said apparatus; arms slidably mounted with respect to said guides and having their outer ends operatively connected with the opposite ends of said support; means for reciprocating the said arms during an inactive cycle of the said conveyor, thereby to bring the lower portions of the cups on said support into and out of engagement with the mouths of the bottles on the carrier thereabove; and means operative by the movement of the support away from the said carrier, thereby to dislodge from any one or more of the cups any material that may have been received therewithin.

8. In the apparatus recited in claim 7, cross heads connecting the outer ends of the arms with the opposite ends of the said support, and the means which are operative by the movement of the support away from the carrier, thereby to dislodge from any one or more of the cups any material that may have been received therewithin, being operatively connected with the said cross heads.

9. An apparatus for cleaning bottles comprising: a conveyor having transversely extending bottle carriers each provided with seats for supporting bottles in an inverted position thereon and means for imparting intermittent movement to said conveyor; a pair of supporting members extending transversely of the said apparatus in parallel relation to each other; a series of cup segments supported by each of the said members and adapted and so arranged that, when the supporting portions of the said members are in proximity to each other, cups comprising the said segments will be formed; vertical guides on opposite sides of the said apparatus; arms slidably mounted with respect to the said guides; means connecting each of the said arms with the ends of the supporting members adjacent thereto, the connecting means between said arms and the opposite ends of one of said members including a pivotal connection; means for raising the said arms with respect to a carrier thereabove during an inactive cycle of the conveyor and for also lowering the said arms away from said carrier during such inactive cycle; means operative by the raising movement of said arms for rocking the pivotally supported member in a direction to bring the cup segments on said members into assembled relation with respect to one another and also operative by the lowering movement of the said arms for rocking the pivotally supported member in the reverse direction thereby to separate the cup segments carried by the said members.

10. An apparatus for cleaning bottles comprising: a conveyor having transversely extending bottle carriers each provided with seats for supporting bottles in an inverted position thereon and means for imparting intermittent movement to said conveyor; a pair of supporting members extending transversely of the said apparatus in parallel relation to each other; a series of cup segments supported by each of the said members and adapted and so arranged that, when the supporting portions of the said members are in proximity to each other, cups comprising the said segments will be formed; a cross head at opposite ends of the said supporting members and each pivotally connected to the ends of the said members adjacent thereto; vertical guides on opposite sides of the said apparatus; arms slidably mounted with respect to the said guides and each having its outer end connected with a cross head; means for raising the said arms and the cross heads and supporting members with respect to a carrier above said members during an inactive cycle of the conveyor and for also lowering the said arms and the cross heads and supporting members away from said carrier during such inactive cycle; and means operative by the raising movement of the cross heads for rocking the said supporting members about their pivots thereby to bring the cup segments on one of said supporting members into assembled relation with the cup segments on the other of said supporting members and operative by the lowering movement of the cross heads for rocking the said supporting members about their pivots in a direction to separate the segments carried by one of said supporting members from those carried by the other of said supporting members.

11. An apparatus for cleaning bottles comprising: a conveyor having transversely extending bottle carriers each provided with seats for supporting bottles in an inverted position thereon and means for imparting intermittent movement to said conveyor; a pair of supporting members extending transversely of the said apparatus in parallel relation to each other; a series of cup segments supported by each of the said members and adapted and so arranged that, when the supporting portions of the said members are in proximity to each other, cups comprising the said segments will be formed; vertically reciprocable means connected with the said supporting members for moving the latter toward and from a carrier thereabove during an inactive cycle of the conveyor thereby to bring the lower portions of the cups into and out of engagement with the mouths of the bottles on the carrier thereabove; and means operative by the downward movement of the supporting members for moving one of the same away from the other thereby to separate the cup segments and dislodge from any one or more of the cups any material that may have been received therewithin.

12. In the apparatus recited in claim 11, there being vertical guides on opposite sides of the apparatus and means reciprocable along said guides and connected with the supporting members for insuring movements of the latter toward and from a bottle carrier thereabove.

13. An apparatus for cleaning bottles comprising: a conveyor having transversely extending bottle carriers each provided with seats for supporting bottles in an inverted position thereon and means for imparting intermittent movement to said conveyor; a pair of supporting members extending transversely of the said apparatus in parallel relation to each other; a series of cup segments supported by each of the said members and adapted and so arranged that, when the supporting portions of the said members are in proximity to each other, cups comprising the said segments will be formed; vertically reciprocable means connected with the said supporting members for moving the latter toward and from a carrier thereabove during an inactive cycle of the conveyor thereby to bring the lower portions of the cups into and out of engagement with the mouths of the bottles on the carrier thereabove; means operative by the downward movement of the supporting members for moving one of the same away from the other thereby to separate the cup segments and dislodge from any one or more of the cups any material that may have been received therewithin; and also operative by the upward movement of the supporting members for bringing the said supporting members into operative relation to each other, thereby to form cups from the segments supported by said members; vertical guides on opposite sides of the said apparatus; and means reciprocable along said guides and connected with the supporting members for insuring movements of the latter toward and from the bottle carrier thereabove.

ERNEST R. BECKER.